(12) United States Patent
Patel et al.

(10) Patent No.: US 9,021,027 B2
(45) Date of Patent: Apr. 28, 2015

(54) TECHNIQUES FOR ALERTING A USER OF UNCHECKED MESSAGES BEFORE COMMUNICATION WITH A CONTACT

(75) Inventors: Labhesh Patel, San Francisco, CA (US); Sanjeev Kumar, San Francisco, CA (US); Mukul Jain, San Jose, CA (US); Joseph Khouri, San Jose, CA (US); Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1870 days.

(21) Appl. No.: 11/408,696

(22) Filed: Apr. 20, 2006

(65) Prior Publication Data

US 2007/0250581 A1 Oct. 25, 2007

(51) Int. Cl.
*G06F 15/16* (2006.01)
*G06Q 10/10* (2012.01)
*H04L 12/58* (2006.01)

(52) U.S. Cl.
CPC ............ *G06Q 10/107* (2013.01); *H04L 12/581* (2013.01); *H04L 12/587* (2013.01); *H04L 51/04* (2013.01); *H04L 51/24* (2013.01)

(58) Field of Classification Search
CPC ....................................................... G06F 15/16
USPC ......................................................... 709/206
See application file for complete search history.

(56) References Cited

U.S. PATENT DOCUMENTS

| | | | | |
|---|---|---|---|---|
| 7,228,334 | B1* | 6/2007 | Jordan, Jr. | 709/206 |
| 7,430,582 | B1* | 9/2008 | Bates et al. | 709/207 |
| 8,577,967 | B1* | 11/2013 | Chavez et al. | 709/206 |
| 2004/0119758 | A1* | 6/2004 | Grossman et al. | 345/839 |
| 2004/0181580 | A1* | 9/2004 | Baranshamaje | 709/206 |
| 2005/0135681 | A1* | 6/2005 | Schirmer | 382/229 |
| 2005/0149617 | A1 | 7/2005 | Turnbull et al. | |
| 2005/0162508 | A1 | 7/2005 | Basmadjian et al. | |
| 2005/0210394 | A1 | 9/2005 | Crandall et al. | |
| 2005/0216550 | A1 | 9/2005 | Paseman et al. | |
| 2005/0249196 | A1 | 11/2005 | Ansari et al. | |
| 2005/0261964 | A1 | 11/2005 | Fang | |
| 2005/0286466 | A1 | 12/2005 | Tagg et al. | |
| 2005/0286494 | A1 | 12/2005 | Hollatz et al. | |
| 2006/0013254 | A1 | 1/2006 | Shmueli et al. | |
| 2006/0046727 | A1 | 3/2006 | Sanders et al. | |
| 2006/0072569 | A1 | 4/2006 | Eppinger et al. | |
| 2006/0107227 | A1* | 5/2006 | Kiljander | 715/772 |
| 2009/0018835 | A1* | 1/2009 | Cooper et al. | 704/257 |
| 2009/0030998 | A1* | 1/2009 | Blagsvedt et al. | 709/206 |
| 2010/0057845 | A1* | 3/2010 | Thomas et al. | 709/203 |

OTHER PUBLICATIONS

Anonymous. Notify the sender of any pending unprocessed messages from the recipient before completing the connection with the recipient. 2010.*

Vatticuti. Sending Voice Mail Messages in a Telephone via Email. Feb. 28, 2001.*

* cited by examiner

*Primary Examiner* — Bryan Lee
(74) *Attorney, Agent, or Firm* — Parker Ibrahim & Berg LLC; James M. Behmke; Stephen D. LeBarron (57) ABSTRACT

In one embodiment, techniques for alerting a user of unchecked messages correlated to a contact before communicating with the contact are provided. The check for unchecked messages may be performed across a plurality of communication modalities. If one or more unchecked messages are found, then the user is alerted that there may be unchecked messages. The user may then have the option to check the unchecked messages before contacting the contact.

24 Claims, 6 Drawing Sheets

TECHNIQUES FOR ALERTING A USER OF UNCHECKED MESSAGES BEFORE COMMUNICATION WITH A CONTACT

BACKGROUND OF THE INVENTION

Embodiments of the present invention generally relate to telecommunications and more specifically to techniques for alerting a user of unchecked messages before communicating with a contact.

In business and relationships, it is important to make efficient use of other user's time. With the many modes of communication available, it is possible for a user to leave messages in many different ways. For example, some of the modes in which messages may be left include instant messaging, voicemail, email, facsimile, etc. When a user calls a contact, it is possible that the contact has left a message for the user that the user has not checked. In some cases, the contact may have left a message that is on the topic that the user is calling about. The contact may then have to rehash the message. Accordingly, a contact may become annoyed and this is an inefficient use of user's and contact's time.

The use of different modalities of communication further complicates the situation. For example, if a user calls a contact from his/her cellular phone, the contact may have left a detailed message for the user on the user's enterprise voicemail. However, the user is not aware there is a new message from the contact because the user may be on his/her way to the office and therefore has not checked his/her voice messages at the office. The user may then just start talking to the contact and ask the contact for the same information that the contact has already left on the user's voicemail. Thus, in this situation, the contact can repeat the information over again or just tell the user to check the message. This conveys a bad impression of the user and in addition wastes the effort of the contact in leaving the detailed message.

DETAILED DESCRIPTION OF EMBODIMENTS OF THE INVENTION

Embodiments of the present invention alert a user of unchecked messages correlated to a contact before communicating with the contact. The check for unchecked messages may be performed across a plurality of communication modalities. If one or more unchecked messages are found, then the user is alerted that there may be unchecked messages. The user may then have the option to check the unchecked messages before contacting the contact.

The correlation of the unchecked messages for a contact across a plurality of modalities may be performed using a unified messaging system. An embodiment of this system will be described in FIG. 1. It will be understood, however, that embodiments of the present invention do not need to be used with the unified messaging system described in FIG. 1. For example, other methods, as described below, may be used to aggregate messages across a plurality of modalities, such as aggregating personal messages rather than enterprise messages.

Figure 1:
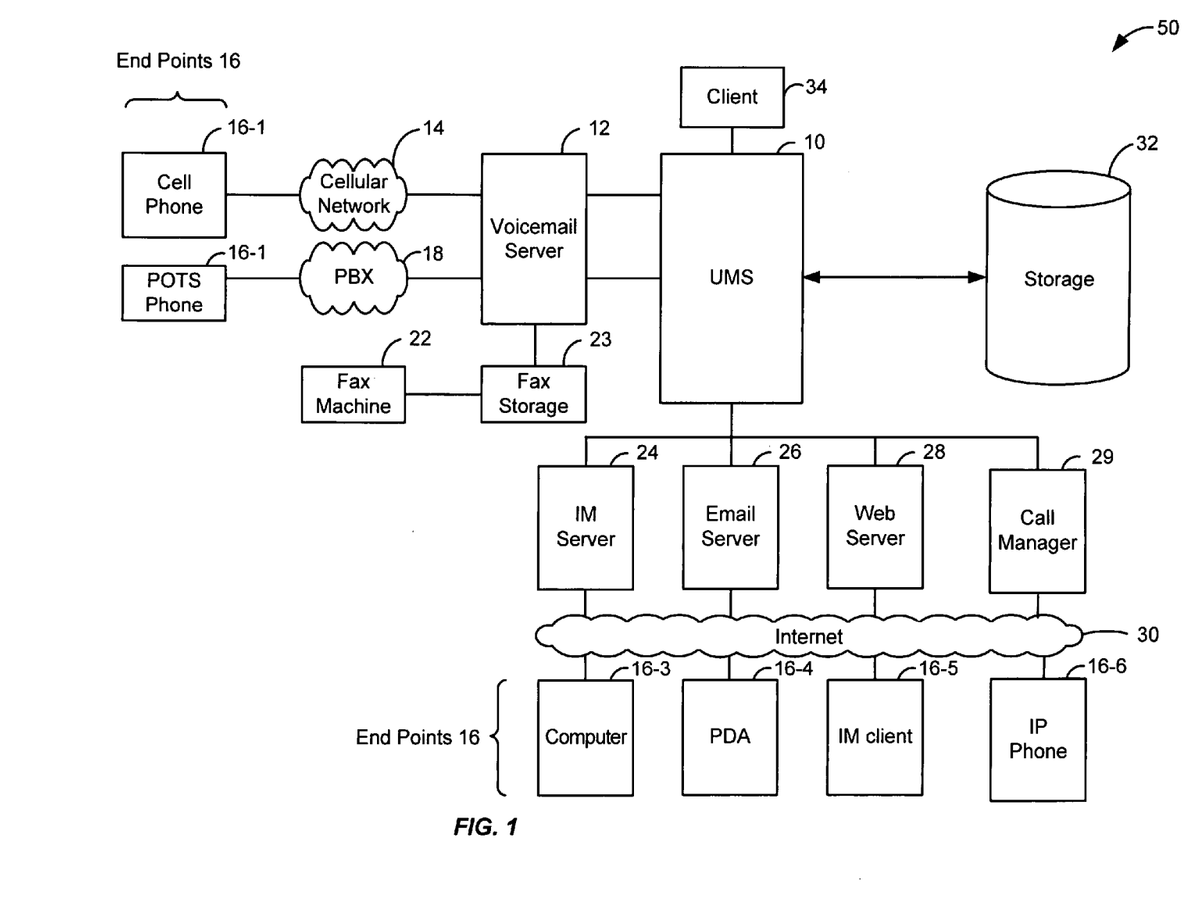
FIG. 1 depicts a unified messaging environment according to one embodiment of the present invention.

FIG. 1 depicts a unified messaging environment 50 according to one embodiment of the present invention. In one embodiment, a unified messaging system (UMS) 10 provides a single access point for messages for a user regardless of the message type and the message origination (e.g., communication modality). For example, unified messaging system 10 may deliver emails, voicemails, instant messages, short message service (SMS) messages, and facsimile messages to a single inbox, such as a user's email box. Thus, the user can check all messages from a single point. Using unified messaging, the user can listen to his/her email over the telephone, check voice messages through their email inbox, view a fax through his/her email inbox, etc.

Various communication modalities are shown in environment 50. A modality refers to a "mode" of communication. A modality can be distinguished by data format, type of signal, physical link or infrastructure, or other characteristic of a communication. For example, email, telephone, VOIP, instant messaging, chat, web posting, web page displaying, faxing, paging, etc., can each be considered a "modality." Also, a modality may be broken up into sub-modalities, such as instant messaging may be broken up into AOL AIM™, MSN Messenger™, and Yahoo! IM modalities.

The various communication modalities may store messages on various storage media. Also, it may be a history of communications, such as a call history from a cellular phone. In some cases, text-to-speech and speech-to-text converters may be used. For example, an email message may be converted into voice using a speech-to-text converter. Also, the email message may be stored and then the conversion is performed in real-time when the voice representation of the email message is needed.

Various end points 16 in environment 50 may be used to send messages to a user. End points 16 may include any devices that can communicate in a modality, such as a cell phone 16-1, a POTS phone 16-2, a computer 16-3, a personal digital assistant 16-4, an IM client 16-5, a router, etc.

As shown, a cell phone 16-1 may be used to send voice messages through a cellular network 14. The voice messages may be managed by voicemail server 12.

Also, a POTS phone 16-2 may be used to leave or send voice messages through a PBX system 18. Another modality may be a facsimile modality. As shown, a FAX machine 22 may send a FAX to the user stored in FAX storage 23.

Other communication modalities may use the Internet to communicate. Although the Internet is described, any packet-based network may be used, such as any local area network, wide area network, wireless network, etc. Email, voicemail, web pages, instant messages, etc. may be sent through an Internet 30. As shown, instant messages may be stored on an IM server 24, emails may be stored on an email server 26, and web pages may be stored on a web server 28. End devices of a computer 16-3, PDA 16-4, IM client 16-5, or any other end device may be used to send messages to the user or used by the user to send messages to contacts. IP phone 16-6 is used to make voice over IP (VOIP) calls. A call manager 29 is used to manage the calls and any messages (e.g., voice messages) for the IP phone modality.

Although the above modalities are described, it will be understood that other communication modalities may be appreciated by persons skilled in the art. For example, unified messaging system 10 may access messages from enterprise modalities. An enterprise modality may be any modality controlled by an enterprise (e.g., a business or company). Examples include an enterprise's email, voicemail, etc. Although enterprise modalities are described, it will be understood that unified messaging system 10 may access non-enterprise messages. Also, techniques described below allow non-enterprise messages to be accessed.

Unified messaging system 10 is configured to aggregate messages from various media into storage 32. Although it is described that messages are stored in storage 32, it will be recognized that messages do not have to be physically stored in a single storage device. For example, voice messages may be stored on an email server; email messages, instant messages, etc. may be stored on a voicemail server; etc. Thus, messages may be stored in multiple storage areas (i.e., distributed). However, for discussion purposes, messages from various modalities will be discussed as being stored in storage 32. However, messages stored on IM server 24, email server 26, voicemail server 12, fax storage 23, and web server 28 may be logically aggregated by unified messaging system 10, but will be described as being stored in storage 32.

A client 34 may be used to view the messages aggregated by unified messaging system 10. For example, a personal computer may be used to view email messages, voice messages, and faxes in an email inbox.

Figure 2:
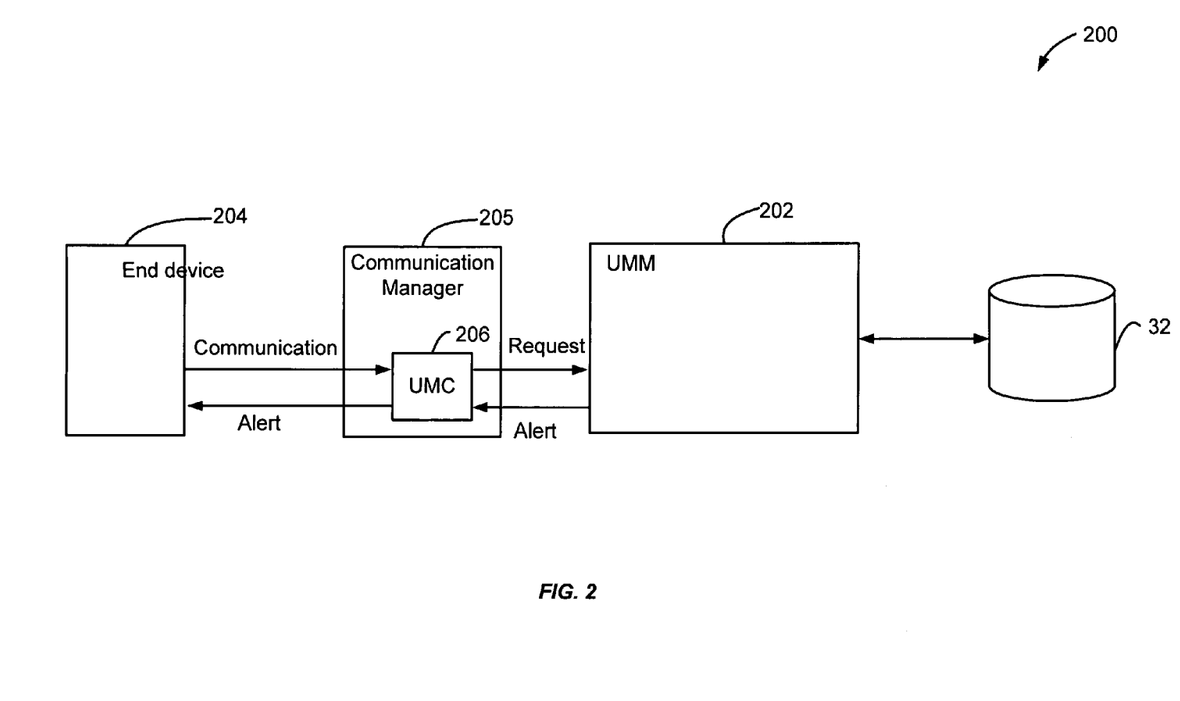
FIG. 2 depicts a system for alerting the user of unchecked messages according to one embodiment of the present invention.

FIG. 2 depicts a system 200 for alerting the user of unchecked messages according to one embodiment of the present invention. As shown, an unchecked message module 202, an end device 16, and storage 32 are provided.

End device 16 may be any device configured to connect to a contact. The term "connecting" and variants thereof (e.g., connection, connect, connected) as used in this application are intended to be construed broadly. For example, a connection can be achieved by any type of communication link, mode, signal type, protocol, format, etc., as desired. Any number and type of end devices can be used to achieve one or more connections.

End device 16 may be telephonic device attempting to make a telephone call, an email application attempting to send an email, an instant messaging client attempting to send an instant message, etc. Although a device is described, it will be recognized that the device may include an application, or any combination. In some instances, end device 16 may initiate a live connection to a contact (e.g. by cellular telephone call) or a non-real-time communication such as email message.

When a communication is initiated, an unchecked message client (UMC) 206 is configured to intercept the communication. In one embodiment, UMC 206 may be located remotely from end device 16. For example, UMC 206 may be located in communication manager 205. Communication manager 205 may be any device configured to manage communications from end device 16. For example, communication manager 205 may be call manager 29. Also, communication manager 205 may be located in a server, router, or any other device in a network. In another embodiment, UMC 206 may be located on end device 16 and may intercept the communication before it is sent from end device 16.

In one embodiment, the communication may be a telephone call, email message, instant message, etc. The intercepting may occur when a user sends the communication, attempts to send the communication, is in the process of sending the communication (i.e., is drafting a message), etc. For example, a user may dial a phone number and select send when a cellular telephone call is desired. Also, the user may compose an email and select send, compose an instant message and select send, etc. Also, UMC 206 may intercept the communication at other times, such as when a contact is initially typed into a message. For example, when a user types in a contact's email address in the "To:" or "CC:" entries, UMC 206 may intercept the communication to check for unchecked messages. Thus, intercepting may occur at any time during a communication. The intercepting is thus made before a communication attempt is completed with the contact. The completion may be the connecting of both the user and contact in a conversation, the sending of an email to the contact where the contact will receive the email, the sending of an instant message such that the contact receives the instant message, etc.

When UMC 206 intercepts a communication for a contact, the communication may not be sent until it is determined if there are any unchecked messages for the contact. It will be understood that a user can disable the checking for unchecked messages if desired. For example, for some contacts, the user may disable the option to intercept a communication for a contact.

After intercepting the communication, UMC 206 sends a request to unchecked message module (UMM) 202. The request sends contact information for the contact that can be used to check for unchecked messages across a plurality of modalities. In one embodiment, UMC 206 may send a telephone number using DTMF key sequences, such as in the case when a cellular telephone call is being made. Also, UMC 206 may communicate through a data channel and send the contact information, such as an email address, telephone number, instant message username, or any other information that identifies the contact.

Unchecked message module 202 is then configured to determine if there are any unchecked messages correlated to the contact. The check may be performed across a plurality of communication modalities.

In one embodiment, unchecked message module 202 may query unified messaging system 10 to determine if there are any unchecked messages. Further, as described below, other methods of checking for unchecked messages may be provided, such as checking for non-enterprise messages.

Because a plurality of modalities are checked, a contact may have different identifiers for different modalities. In one embodiment, unchecked message module 202 may determine other identifiers for the contact across a plurality of modalities. For example, unchecked message module 202 may use an enterprise directory and/or a user's personal address book to find the contact's name, email addresses, IM usernames, and other phone numbers of the contact. Mappings between the different identifiers may be used to determine other identifiers in different modalities.

In other embodiments, a correlation may be made to a universal identity. For example, for a telephone number dialed, the name of the user may be determined as the universal identity. The universal identity may then be associated with messages for the contact across multiple modalities. In yet another embodiment, the correlation may correlate messages from other users that are the same topic as the current communication.

Figure 3:
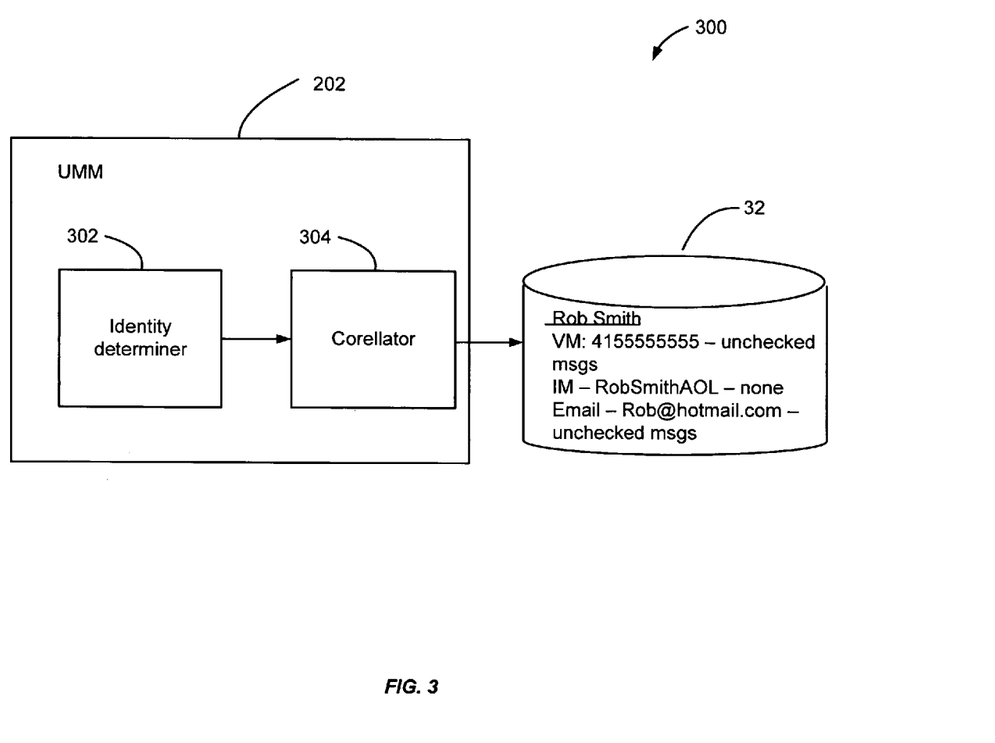
FIG. 3 depicts an embodiment of an unchecked message module for performing correlation according to one embodiment of the present invention.

FIG. 3 depicts an embodiment of UMM 202 for performing correlation according to one embodiment of the present invention. As shown, UMM 202 may include an identity determiner 302 and a correlator 304. Identity determiner 302 receives an identifier for a contact. In this example, the contact information may be Rob_Smith@hotmail.com. Identity determiner 302 is then configured to determine the identity for the contact information. Identity determiner 302 may look for a universal identity in a table. For example, Rob Smith may be the universal identity for the email address Rob_Smith@hotmail.com.

Correlator 304 then receives the universal identity and is configured to determine other identifiers for that universal identity across a plurality of modalities. As shown, for the universal identity Rob Smith, a plurality of modalities is listed, such as voicemail, instant messaging, and email. The contact information for each modality is shown in storage 32.

Also, correlation by topic may be performed. In addition to checking for messages from the contact, correlator 304 may check to see if there has been a message on the same topic that is unchecked. For example, users A, B and C are members of the same distribution list. User C "replies to all" to a message with a topic of XYZ and therefore users A and B have that reply in their mailbox. Neither user A nor user B has had the opportunity to read the e-mail from user C. In parallel, user A is about to send a message to user B about the same topic XYZ. Correlator 304 correlates the messages by topic, and alerts user A that a message with the same topic has been received from user C and he/she may want to read it before sending the message to user B.

The correlation may be done solely on the topic. For example, all messages for the topic are searched regardless of the sender. A text search in the content of messages or a search of subject lines may be performed. Also, the correlation may be search for messages that have user B as a recipient of the message and the same topic.

Although the above method of correlation is provided, it will be understood that other methods of correlation may be appreciated. For example, identifiers for different modalities may be mapped to each other.

Referring back to FIG. 3, UMM 202 may take the contact information for the different modalities and in real-time determine if there are any unchecked messages for those modalities. For example, for the email Rob_Smith@hotmail.com, the public email address account may be accessed to determine if there are any unchecked messages.

In one embodiment, storage 32 may be checked to determine if there are any unchecked messages. As shown in FIG. 3, there may be an indication whether there are unchecked messages. Also, it will be understood that the unchecked messages may be stored in the distributed storage 32.

In one embodiment, an unchecked message may be any message in an unchecked state. For example, an unchecked message may be unchecked if it is indicated that a user has not listened to a message, opened a message, or any status that is interpreted as unchecked (e.g., an important status), etc. Also, it will be recognized that even though a user may have opened or listened to a message, it still may be marked unchecked. For example, an email may have been read but the user may have picked the option to leave it unread. This may have been because the user did not have sufficient time to read the email or may have wanted it to have an unread state. Thus, the message may be determined to be in an unchecked state in this case.

In one embodiment, a contact that leaves a message is given an option to mark the message as read necessary before accepting a new communication from the user. Users can then configure UMC 206 to only intercept a call if there are only any read necessary messages from the contact being contacted.

If there are any unchecked messages, unchecked message module 202 generates an alert and sends it to UMC 206. In one embodiment, the alert may be generated intelligently depending on the end device that user is using. For example, a voice alert may be generated for a telephonic device, an email may be generated for an email being sent, an instant message may be generated for a user using an instant message client, etc. The correct modality, such as a voice modality or data modality may be used depending on preferences. In another embodiment, UMC 206 probes UMM 202 for unchecked messages for a contact. UMM 202 does not need to generate an alert in this case.

The alert that is sent to UMC 206 may include any content. For example, the alert may just state that unchecked messages were found and ask if the user wants to check them. Also, the alert may include a list of the unchecked messages and which modalities they are in.

In one embodiment, contacts that leave messages may be given an option to specify a topic (or a list of words or phrases) that describes the content of the message. This information may be presented to a user to help the user decide whether or not he/she wants to listen to the particular unchecked message. In another embodiment, the user may specify the topic about which he/she is calling and UMM 202 may inform the user that there are unchecked messages from the contact only if the topic of the unchecked messages matches the topic specified by the user.

An interface, such as a telephone user interface or graphical user interface, may then be provided to a user in which the user can choose to check the unchecked messages from the contact. Also, an option may be provided that the user can be connected to the contact without listening to the unchecked messages.

When checking the unchecked messages, if the message is in a different communication modality than that which the end device 16 is enabled for, certain intelligent conversions may be performed. For example, an email message may be converted into speech using a text-to-speech converter. Thus, the user may listen to the email over a telephonic device. Further, different modalities may be used. The user may be contacting a contact using a voice modality but a data modality may be used to send an unchecked email from the contact to the user.

When the user has checked the unchecked messages that are desired, then the user can opt to be connected to the contact. UMC 206 then initiates a communication to the contact and releases control back to end device 16. For example, UMC 206 may send a command to communication manger 205 to proceed with the call that has been initiated by end device 16. End device 16 is then participating in the call as if UMC 206 had not existed. For example, if the user had initially dialed a telephone number, that telephone number is dialed by UMC 206 (or communication manager 205) and then UMC 206 drops out of the communication.

If there are no unchecked messages for the contact, then unchecked message module 202 informs UMC 206 that there are no unchecked messages. In one embodiment, the user is informed that there are no unchecked messages from the contact before UMC 206 initiates the communication. For example, UMC 206 may send a command to communication manger 205 to proceed with the call that has been initiated by end device 16. In other embodiments, UMC 206 may send the command to communication manager 205 without alerting the user that there are no unchecked messages and the user can just assume that no unchecked messages were found.

Figure 4:
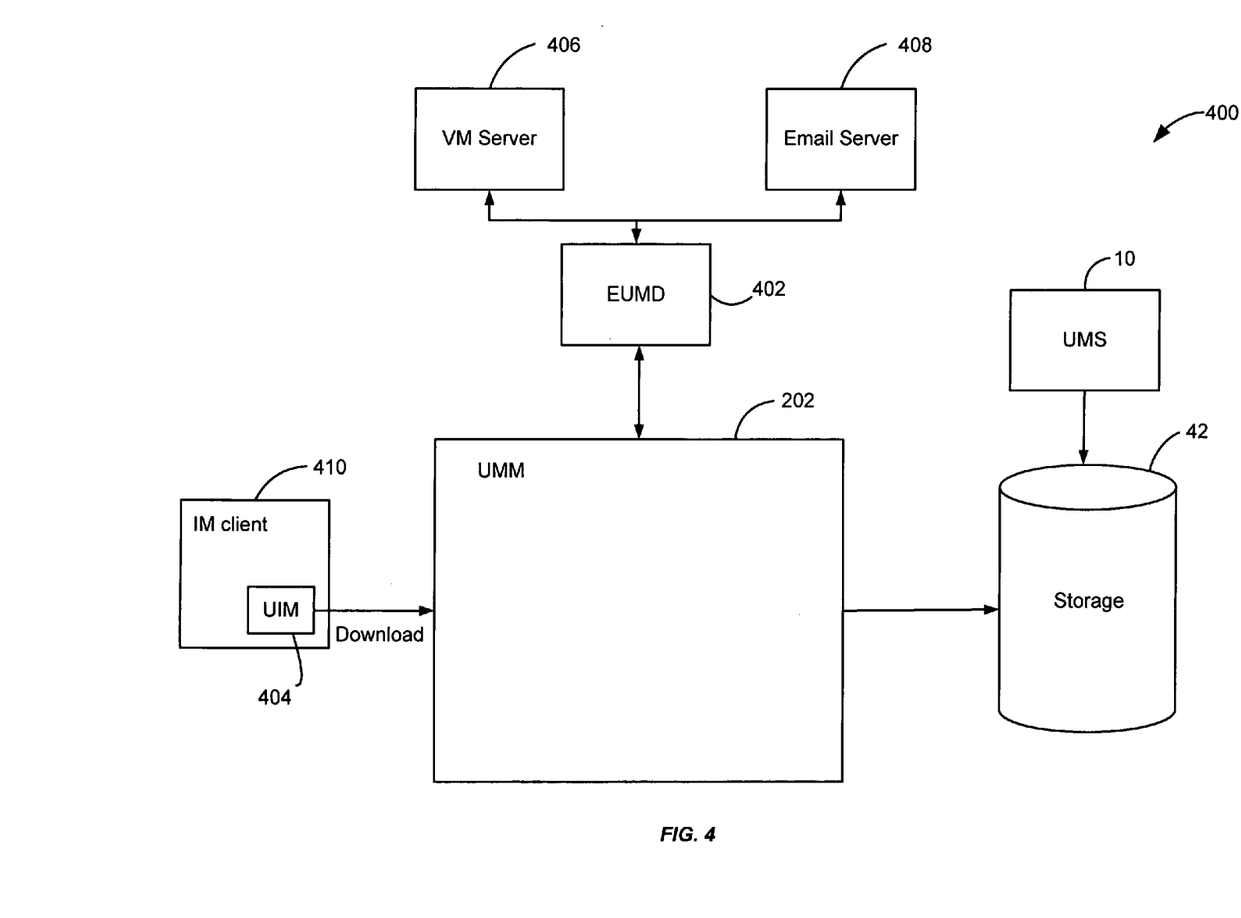
FIG. 4 shows a system for correlating messages for a contact according to one embodiment of the present invention.

FIG. 4 shows a system 400 for correlating messages for a contact according to one embodiment of the present invention. As shown, UMM 202 may aggregate messages across a plurality of modalities. In one embodiment, unified message system 10 may aggregate messages for an enterprise. For example, email, voicemail, and instant messaging may be aggregated for a user's enterprise accounts.

In other embodiments, messages from non-enterprise accounts may be aggregated also. In one embodiment, an external unchecked message downloader (EUMD) module 402 and unchecked instant message module (UIM) 404 UIM may be used to download messages.

EUMD 402 is configured to access a user's non-enterprise messages from public telephone services and public email providers. In one embodiment, EUMD 402 may access messages in voicemail server 12 and email server 26.

A user may use a graphical user interface or telephone user interface to configure EUMD 402 such that it can access the user's non-enterprise messages. For example, the user may provide his/her personal voicemail numbers and PINs, such as the voicemail number "503-555-5555" and the pin "3210". EUMD 402 may then access the voicemail system number and enter the pin to access the user's voicemail system either via dialing into it or by connecting to it via a network, such as an IP network and obtain the status of the unchecked messages for any specific user.

In one embodiment, EUMD 402 downloads the status that indicates which messages have not been checked. In addition, EUMD 402 may also download a pointer of handle to the unheard messages. This process can be referred to as logical download of voicemail messages.

In another embodiment, the unchecked messages may be downloaded by EUMD 402 to UMM 202. These messages may then be stored in storage 32.

EUMD 402 may determine any voicemail messages in an unchecked state. For example, EUMD 402 may check the envelope information of a voice message to determine if a message is new. In this case, it may be determined that the voicemail message is in an unchecked state.

EUMD 402 may access voicemail server 12 in real-time when a message is sent. In other embodiments, EUMD 402 may access voicemail server 12 periodically. Also, voicemail server 12 may automatically notify EUMD 402 of unchecked messages when they are received.

When a user requests to hear the unchecked message, EUMD 402 may access voicemail server 12 in real-time to download the message and provide it to the user. For example, a pointer to the message may be used to retrieve the message from voicemail server 12. Also, if the message was previously downloaded by EUMD 402 and stored in storage 32, the message may be provided to the user.

To keep the state of voicemail in voicemail server 12 consistent, EUMD 402 may connect to voicemail server 12 after the message has been heard, and indicate that message has been checked. In other embodiments, EUMD 402 may mark the message as being checked when it is downloaded. However, if a user does not check the message, then EUMD 402 may log back in to voicemail server 12 and mark the message as being unchecked.

EUMD 402 may also check for unchecked email messages. In one embodiment, a user may provide EUMD 402 with email access information for other email systems. For example, the user may provide the address of an email server, such as an internet service provider's (ISP) POP address—e.g., pop.myisp.com, along with a user ID and password that may be used to access the ISPs POP server. Email may then be accessed through the POP server using known methods.

In another example, a user may allow public email providers, such as Google's Gmail™ and MSN's Hotmail™, to be accessed by providing a username and password that allows the email provider's email web page to be accessed. EUMD 402 may use a standard POP access protocol or an email download tool to check for unchecked email addresses.

In one embodiment, EUMD 402 may download unchecked email messages along with their headers and pass this to UMM 202 for storage in storage 32. This may be done periodically or in real-time when a request is received from UMC 206. Further, email server 26 may notify EUMD 402 of unchecked messages.

After the user has listened to messages or as a parallel process, EUMD 402 may log in to email server 26 change the message to a checked state. Also, EUMD 402 may mark the message as being checked when it is downloaded. However, if a user does not check the message, then EUMD 402 may log back in to email server 26 and mark the message as unchecked.

Instant messages may also be checked using UIM 404, which may be downloaded by an IM client 410. For example, UIM 404 may be stored as a plug-in to IM client 410.

UIM 404 is configured to determine if there are any unchecked instant messages for the contact. Instant messages may not be explicitly marked as new or unchecked in some examples. Rather, when an instant message is sent, it may be sent if the user is online or may be rejected if the user is offline. If the user is offline, the instant messages may be cached, however.

UIM 404 may use many methods to determine if an instant message is in an unchecked state. For example, UIM 404 may determine that the user may not have seen a message from a contact if an IM client window has been open with messages but IM client 410 has been idle since the IM message was sent. Also, UIM 404 may determine that an instant message is unchecked if the status of IM client 410 indicates that the user was possibly away and not able to check messages. For example, if the status is away for the user when a message is received, it may be assumed that the instant message is in an unchecked state. Further, any messages cached while IM client 410 was offline may be considered unchecked.

In one embodiment, the check for unchecked instant messages may be performed for online IM clients 410. This may be because instant messages may only be saved when IM clients 410 are online. UIM 404 may be configured by a user to register with UMM 202. Thus, UMM 202 knows when an IM client 410 is online. For example, when a user starts IM client 410 (e.g. Yahoo! Messenger), UIM 404 registers its address with UMM 202 and provides any credentials supplied by the user.

Also, in one embodiment, for enterprise IM clients 410 (such as SameTime), a user may not have to configure UIM 404 because UIM 404 may download the information from an enterprise unified messaging system and credentials needed to register with it from IM client 410. In any of the above embodiments, whenever a user logs on to IM client 410 that includes an UIM 404, UIM 404 registers itself with UMM 202.

In one embodiment, when a request is received from UMC 206, UMM 202 may interrogate any UIM modules 404 that are online. For example, if the user has a Yahoo! Messaging IM client running on his/her home personal computer and a Same Time IM client running on his/her office laptop, then UMM 202 interrogates the UIM modules 404 for both of IM clients 410 to provide any unchecked message information.

Figure 5:
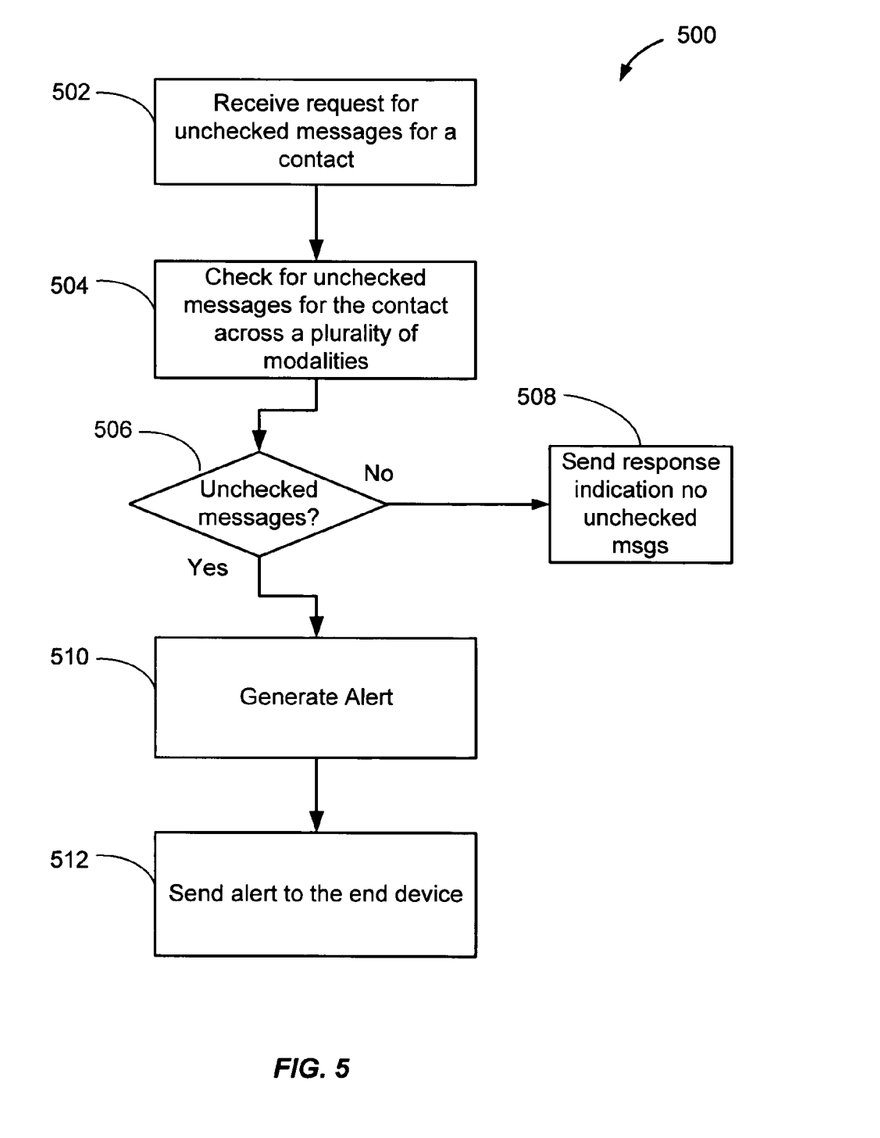
FIG. 5 depicts a simplified flow chart of a method for alerting a user of unchecked messages for a contact according to one embodiment of the present invention.

FIG. 5 depicts a simplified flow chart 500 of a method for alerting a user of unchecked messages for a contact according to one embodiment of the present invention. In step 502, UMM 202 receives a request for unchecked messages for a contact from UMC 206.

In step 504, UMM module 202 checks for unchecked messages correlated to the contact across a plurality of modalities. The check may be performed as described above.

In step 506, it is determined if there are any unchecked messages. If no unchecked messages are found, in step 508, a response is sent to UMC 206 indicating that there are no unchecked messages.

If there are unchecked messages, in step 510, an alert is generated. The alert may be generated intelligently depending on the modality that end device 16 is communicating in.

In step 512, the alert is sent to end device 16.

Figure 6:
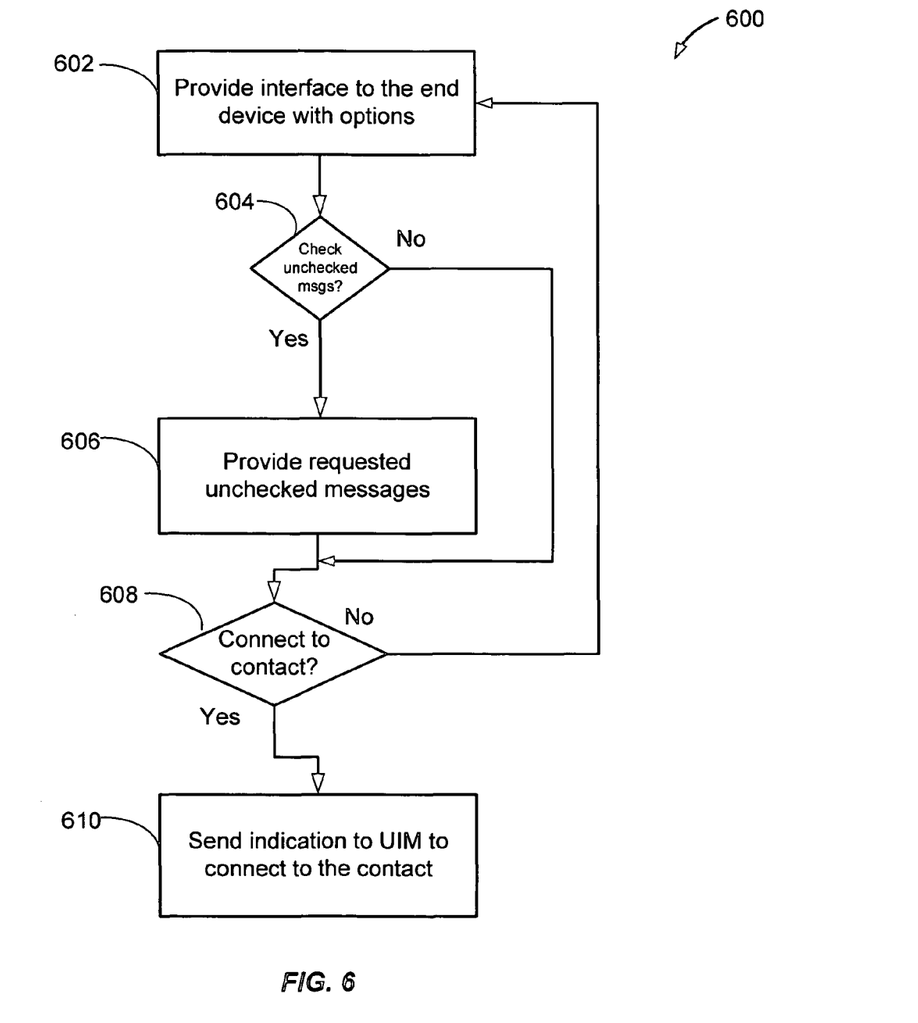
FIG. 6 depicts a simplified flowchart of a method for providing unchecked messages according to one embodiment of the present invention.

FIG. 6 depicts a simplified flowchart 600 of a method for providing unchecked messages according to one embodiment of the present invention. In step 602, an interface is provided to end device 16 with options to proceed with the unchecked messages. The user may then select an option, such as an option to check the unchecked messages.

In step 604, it is determined if the command to check unchecked messages is received. If the command to check unchecked messages is received, in step 606, the unchecked messages are provided to the user.

If the user does not desire to check the unchecked messages or if the user has been provided the unchecked messages, in step 608, it is determined if a signal to contact the contact is received.

If the signal is received, in step 610, UMM 202 sends a signal to UMC 206 that the communication to the contact should be completed. If the user does not want to connect, then further options via the interface may be provided.

Embodiments of the present invention provide many advantages. For example, a user can check unchecked messages before a communication is made to a contact. Because the check is made across of plurality of modalities, the user does not have to go through the trouble to check all modalities manually to determine if the contact has previously left a message. Further, because unchecked messages are checked before communicating with a contact, strategic information that may be used in a communication may be checked before calling. This may give an advantage to the user that may not have been available had the message not been checked.

Accordingly, embodiments of the present invention allow a user to efficiently communicate with a contact. Further, irritation and repetition of information already left in messages is avoided. This may enhance the relationship with a contact.

Although the invention has been described with respect to specific embodiments thereof, these embodiments are merely illustrative, and not restrictive of the invention.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", an and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. A method for alerting a user of unchecked messages by an intended recipient contact, the method comprising:
   intercepting, at a client associated with the user, a communication attempt from the user to the intended recipient contact;
   receiving, at a computing device, a request from the client associated with the user, the request received before the communication attempt yields a communication between the user and the intended recipient contact, the intended recipient contact being different from the computing device;
   determining, at the computing device, the existence of at least one message correlated to the intended recipient contact in an unchecked state for messages in a plurality of communication modalities by:
      receiving an identifier for the intended recipient contact in a first modality, and
      correlating the identifier for the intended recipient contact to a second identifier for the intended recipient contact in a second modality to determine if there are unchecked messages in the second modality for the intended recipient contact,
      wherein at least one of the plurality of communication modalities is a voice modality, and the communication attempt is in one of the plurality of communication modalities;
   sending, from the computing device, an alert to the client indicating the existence of at least one unchecked message from the intended recipient contact;
   providing an interface to the client, the interface including an option to check the at least one unchecked messages prior to completing the communication attempt;
   receiving a request from the client interface for accessing an unchecked message that is associated with a particular topic in the one or more messages;
   determining an existence of the unchecked message that is associated with the particular topic; and
   based on determining the existence of the unchecked message that is associated with the particular topic, providing the unchecked message that is associated with the particular topic to the client in a first communications modality in the plurality of communications modalities based on the client, wherein, if the unchecked message that is associated with the particular topic is in a second communications modality in the plurality of communications modalities, the unchecked message that is associated with the particular topic is converted to the first communications modality before being provided to the client.

2. The method of claim 1, wherein the plurality of communication modalities comprises two or more selected from an email modality, an instant messaging modality, a voice modality, and a facsimile modality.

3. The method of claim 1, wherein determining the existence of at least one message correlated to the intended recipient contact comprises correlating a topic for a first message being sent to the intended recipient contact to a substantially similar topic of a second message correlated to the intended recipient contact.

4. The method of claim 3, wherein the second message is associated with a second contact different from the intended recipient contact.

5. The method of claim 1, wherein the existence of at least one message comprises checking non-enterprise accounts for the user for unchecked messages.

6. The method of claim 1, wherein the unchecked state comprises an unheard or unread state.

7. A method for alerting a user of unchecked messages by an intended recipient contact, the method comprising:
   intercepting a signal for a communication attempt from an end device to a intended recipient contact at an unchecked message client, the end device being associated with the user;
   sending, from the unchecked message client, a request, the request being sent before the communication attempt yields a communication between the user and the intended recipient contact, the intended recipient contact being different from the unchecked message client;

receiving a response indicating the existence of at least one message correlated to the intended recipient contact in the unchecked state, for messages in a plurality of communication modalities wherein the existence of the at least one message is based on the sending device receiving an identifier for the intended recipient contact in a first modality, and correlating the identifier for the intended recipient contact to a second identifier for the intended recipient contact in a second modality to determine if there are unchecked messages in the second modality for the intended recipient contact, wherein at least one of the plurality of communication modalities is a, wherein at least one of the plurality of communication modalities is a voice modality, and the communication attempt is in one of the plurality of communication modalities; and outputting an alert to the end device to indicate the existence of at least one unchecked messages; and providing an interface to the end device, the interface including an option to check the at least one unchecked messages prior to completing the communication attempt;

receiving a request from the client interface for accessing an unchecked message that is associated with a particular topic in the one or more unchecked messages;

determining an existence of the unchecked message that is associated with the particular topic; and based on determining the existence of the unchecked message that is associated with the particular topic, providing the unchecked message that is associated with the particular topic to the client in a first communications modality in the plurality of communications modalities based on the client, wherein, if the unchecked message that is associated with the particular topic is in a second communications modality in the plurality of communications modalities, the unchecked message that is associated with the particular topic is converted to the first communications modality before being provided to the client.

8. The method of claim 7, further comprising: receiving an indication that the communication attempt should proceed; and allowing the communication attempt to the intended recipient contact to proceed.

9. The method of claim 7, wherein the plurality of modalities comprise two or more selected from a group of an email modality, instant messaging modality, voice modality, and facsimile modality.

10. A device with a non-transitory computer readable medium configured to alert a user of unchecked messages by an intended recipient contact, the device comprising:

a receiver configured to receive a request from a client associated with the user, the request received before the communication attempt yields a communication between the user and the intended recipient contact, the intended recipient contact being different from the computing device;

an unchecked message determiner configured to determine the existence of at least one message correlated to the intended recipient contact in the unchecked state, for messages in a plurality of communication modalities, the unchecked message determiner including:

logic that upon receiving an identifier for the intended recipient contact in a first modality, correlates the identifier for the intended recipient contact to a second identifier for the intended recipient contact in a second modality to determine if there are unchecked messages in the second modality for the intended recipient contact, wherein at least one of the plurality of communication modalities is a voice modality, and the communication attempt is in one of the plurality of communication modalities; and an alert module configured to send an alert to the user that there exists at least one unchecked message, wherein the alert is in a first communications modality in the plurality of communications modalities based on an end device of the user, the alert module being further configured to provide an interface to the user, wherein the interface includes an option to check the at least one unchecked messages prior to completing the communication attempt;

logic configured to receive a request from the client interface for accessing an unchecked message that is associated with a particular topic in the one or more unchecked messages;

logic configured to determine an existence of the unchecked message that is associated with the particular topic; and logic configured to provide, based on determining the existence of the unchecked message that is associated with the particular topic, the unchecked message that is associated with the particular topic to the user in the first communications modality, wherein, if the unchecked message that is associated with the particular topic is in a second communications modality in the plurality of communications modalities, the unchecked message that is associated with the particular topic is converted to the first communications modality before being provided to the user.

11. The device of claim 10, wherein the plurality of modalities comprise two or more selected from an email modality, instant messaging modality, voice modality, and facsimile modality.

12. The device of claim 10, further comprising:
logic configured to receive an identifier for the intended recipient contact in a first modality; and
a correlator configured to correlating the identifier for the intended recipient contact to a second identifier for the contact in a second modality to determine if there are unchecked messages in the second modality for the intended recipient contact.

13. The device of claim 10, further comprising:
logic to determine a topic for a message being sent to the intended recipient contact; and a correlator configured to correlate a topic for a first message being sent to the intended recipient contact to a substantially similar topic of a second message correlated to the intended recipient contact.

14. The device of claim 13, wherein the second message is associated with a second contact different from the intended recipient contact.

15. The device of claim 10, wherein the unchecked message determiner is configured to check non-enterprise accounts for the user for unchecked messages.

16. The device of claim 10, wherein the unchecked state comprises an unheard or unread state.

17. A device with a non-transitory computer readable medium configured to alert a user of unchecked messages by an intended recipient contact, the device comprising:
logic configured to intercept a signal for a communication attempt from an end device to the intended recipient contact at an unchecked message client, the end device being associated with the user;

logic configured to send, from the unchecked message client, a request, the request being sent before the communication attempt yields a communication between the user and the intended recipient contact, the intended recipient contact being different from the unchecked message client;

logic configured to receive a response indicating the existence of at least one message correlated to the intended recipient contact in the unchecked state for messages in a plurality of communication modalities, wherein the existence of the at least one message is based on the sending device receiving an identifier for the intended recipient contact in a first modality, and correlating the identifier for the intended recipient contact to a second identifier for the intended recipient contact in a second modality to determine if there are unchecked messages in the second modality for the intended recipient contact, and at least one of the plurality of communication modalities is a voice modality, and the communication attempt is in one of the plurality of communication modalities;

logic configured to output an alert that there exists at least one unchecked message from the intended recipient, and logic configured to output an interface, wherein the interface includes an option to check the at least one unchecked messages prior to completing the communication attempt;

logic configured to receive a request from the client interface for accessing an unchecked message that is associated with a particular topic in the one or more unchecked messages;

logic configured to determine an existence of the unchecked message that is associated with the particular topic; and logic configured to provide, based on determining the existence of the unchecked message that is associated with the particular topic, the unchecked message that is associated with the particular topic to the user in the first communications modality, wherein, if the unchecked message that is associated with the particular topic is in a second communications modality in the plurality of communications modalities, the unchecked message that is associated with the particular topic is converted to the first communications modality before being provided to the user.

18. The device of claim 17, further comprising:
logic configured to receive an indication that the communication attempt should proceed; and
logic configured to allow the communication attempt to the intended recipient contact to proceed.

19. The device of claim 17, wherein the plurality of modalities comprise two or more selected from a group of an email modality, an instant messaging modality, a voice modality, and a facsimile modality.

20. A system with a non-transitory computer readable medium configured to alert a user of unchecked messages by an intended recipient contact, the system comprising:

an unchecked message client, comprising:
logic configured to intercept a signal for a communication attempt from an end device to the intended recipient contact, the end device being associated with the user; and
logic configured to send, from the unchecked message client, a request, the request being sent before the communication attempt yields a communication between the user and the intended recipient contact, the intended recipient contact being different from the unchecked message client; and an unchecked message module, comprising:
a receiver configured to receive the request from the unchecked message client for the determination the existence of at least one messages correlated to the intended recipient contact for the user in an unchecked state;
an unchecked message determiner configured to determine if there are any message correlated to the intended recipient contact that include the unchecked state for messages in a plurality of communication modalities, wherein at least one of the plurality of communication modalities is a voice modality, and the communication attempt is in one of the plurality of communication modalities;
an alert module configured to send an alert to the unchecked message client that there exists at least one unchecked message, wherein the unchecked message client is configured to output the alert, the alert module further configured to output an interface, wherein the interface includes an option to check the at least one unchecked messages prior to completing the communication attempt;
logic configured to receive a request from the client interface for accessing an unchecked message that is associated with a particular topic in the one or more unchecked messages;
logic configured to determine an existence of the unchecked message that is associated with the particular topic; and
logic configured to provide, based on determining the existence of the unchecked message that is associated with the particular topic, the unchecked message that is associated with the particular topic to the user in the first communications modality, wherein, if the unchecked message that is associated with the particular topic is in a second communications modality in the plurality of communications modalities, the unchecked message that is associated with the particular topic is converted to the first communications modality before being provided to the user.

21. The system of claim 20, wherein the unchecked message client is located on a network device remote from the end device.

22. The system of claim 20, wherein the unchecked message client is located on the end device.

23. The system of claim 20, wherein the end device comprises at least one of a telephonic device, an email application, and an instant message application.

24. The system of claim 20, further comprising storage including unchecked messages from two or more of the plurality of communication modalities.

* * * * *

UNITED STATES PATENT AND TRADEMARK OFFICE
CERTIFICATE OF CORRECTION

PATENT NO. : 9,021,027 B2
APPLICATION NO. : 11/408696
DATED : April 28, 2015
INVENTOR(S) : Patel et al.

It is certified that error appears in the above-identified patent and that said Letters Patent is hereby corrected as shown below:

In the Specification

In column 11, line 24, please amend as follows:
   that follow, "a", [[a]]"<u>an</u>", and "the" includes plural references unless

Signed and Sealed this
Eleventh Day of August, 2015

Michelle K. Lee
*Director of the United States Patent and Trademark Office*